United States Patent [19]

Robra et al.

[11] Patent Number: 4,595,796
[45] Date of Patent: Jun. 17, 1986

[54] METHOD OF AND A CIRCUIT ARRANGEMENT FOR DETERMINING CURRENT CRITERIA IN THE LINES OF A TELEPHONE SYSTEM

[75] Inventors: Jörg Robra, Heroldsberg; Hans Göschin, Nuremberg, both of Fed. Rep. of Germany

[73] Assignee: Te Ka De Felten & Guilleaume Fernmeldeanlagen GmbH, Nuremburg, Fed. Rep. of Germany

[21] Appl. No.: 424,964

[22] Filed: Sep. 27, 1982

[30] Foreign Application Priority Data

Oct. 17, 1981 [DE] Fed. Rep. of Germany ....... 3141375

[51] Int. Cl.$^4$ .............................................. H04M 1/76
[52] U.S. Cl. .............................. 179/18 FA; 179/16 F; 179/175.3 R
[58] Field of Search ............. 179/16 F, 18 FA, 16 A, 179/16 AA, 18 F, 170 D, 81 R, 175.2 C, 18 AD, 175.2 R, 175.3 R, 175.3 F

[56] References Cited

U.S. PATENT DOCUMENTS

| 3,636,280 | 1/1972 | Wetzel | 179/175.3 R |
| 3,916,110 | 10/1975 | Lee et al. | 179/16 F |
| 4,433,213 | 2/1984 | Albers et al. | 179/16 F X |

FOREIGN PATENT DOCUMENTS 2925409 5/1981 Fed. Rep. of Germany.

Primary Examiner—James L. Dwyer
Attorney, Agent, or Firm—Michael J. Striker

[57] ABSTRACT

A method of and a circuit for determining current criteria in a subscriber's loop of a telephone system are described. Two constant-current sources are symmetrically connected to two wires of the loop and are controlled by an adjustable reference voltage source. Voltage signals on the voltage source are evaluated in a detecting circuit to determine the actuation of a ground button on the subscriber's set or the occurrence of a ground short-circuit. A testing device is connectable to the subscriber's loop to simulate various conditions of the subscriber's set.

12 Claims, 3 Drawing Figures

METHOD OF AND A CIRCUIT ARRANGEMENT FOR DETERMINING CURRENT CRITERIA IN THE LINES OF A TELEPHONE SYSTEM

BACKGROUND OF THE INVENTION

The present invention relates in general to a telephone system and in particular to a method of and device for determining and evaluating current conditions in a two-wire loop of a telephone circuit including at least one subscriber's station and an exchange station, whereby two sources of constant current are connected to the loop or circuit symmetrically with respect to the subscriber's station so as to keep a constant current in the circuit irrespective of the length of the line. The method and circuit of this invention are of the type in which current through the telephone wires is measured by means of a measuring device, whereby in the case when different current values are measured, a regulating device is connected to the separate sources of constant current to apply to the latter different reference voltages to supply in the telephone wires a maximum limit current at which the regulating device is closed and means for placing a call to the subscriber's station are activated in a central control device.

From the German published patent application No. 2,556,157 a circuit arrangement for supplying current to a subscriber's apparatus in telephone systems in accordance with the aforedescribed method is described. In this known arrangement, the subscriber's circuit, including the subscriber's terminal such as a telephone apparatus, current is supplied through the telephone line as soon as the user by picking up the receiver closes a corresponding cradle contact. The current supply device which includes two current generators (constant-current sources) arranged symmetrically to the wires leading to the subscriber's station, generates a constant supply current which is independent of the length of operation and on the applied power. The subscriber's stations are provided with a ground button on each telephone apparatus. When the user activates the ground button, one of the two telephone cables of the corresponding subscriber's circuit or loop is grounded. In order to prevent the occurrence of an excessive current through the loop when the latter is short-circuited to ground, and which might cause overheating of the current supplying device, there is provided a zener diode connected to the common connection point of two resistors (measuring device) connected symmetrically to the loop. For evaluating the current conditions in the loop and for detecting the actuation of the ground button, transistors are provided in the loop of the subscriber's circuit, and after picking up the receiver the transistors produce a voltage which can be detected on a central control equipment.

From the German published patent application No. 2,925,409 a circuit arrangement is known by means of which the reporting of a called subscriber of the telephone system can be recognized. Through the detection of zero passages of the speech current passing through the telephone line control clock pulses are generated which are applied to a shift register for shifting at the time points of their occurrence a signal which has been applied to the input of the shift register from the so-called loop current indicators and defining the reporting of the subscriber. In order to distinguish the subscriber's answer during the pause of ringing and during the generation of the ringing current, the output signal of the shift register, which results after several zero passages of the ringing current, is applied together with the output signal from the loop current indicator to an AND-gate.

Both of these prior-art embodiments of cicuit arrangements perform an evaluation of current flowing through the lines of the telephone loop. In evaluating direct and alternating currents flowing during the transmission of ringing signals and by processing these currents by transistors or optoelectric couplers, the latter are prone to damage by excessive voltages occurring in the subscriber's circuit as well as in the evaluation circuit and in the additional circuits applied to the loop. Moreover, the prior-art circuit arrangements of this kind have the disadvantage that pulse-like interference generated in the subscriber's circuit may cause errors in digital evaluation of the loop currents.

SUMMARY OF THE INVENTION

It is therefore a general object of the present invention to overcome the aforementioned disadvantages.

More particularly, it is an object of the present invention to provide an improved method of evaluating current criteria in a telephone circuit which is not affected by interfering pulses in the circuit.

An additional object of the invention is to provide a circuit arrangement for performing the method which is simple in design and economical in manufacture.

In keeping with these objects and others which will become apparent hereafter, one feature of the invention resides, in detecting signals employed for the adjustment of reference voltages in respective constant-current sources and evaluating these signals as a function of current conditions in the circuit.

By evaluating such signals of the regulating device for the reference voltage, the overall design of the circuit arrangement of this invention is considerably simplified and expensive component parts may be eliminated. In the prior-art circuit arrangements for the evaluation of circuit conditions in a telephone loop, a detecting circuit is connected to the subscriber's circuit for determining whether current flowing therethrough have attained a certain threshold value corresponding to the closing process in the subscriber's loop for example. In contrast, the detecting circuits according to this invention evaluate signals of the voltage regulating device resulting from changes of the loop current per time unit. By suitably dimensioning the detecting circuit of this invention, it is possible to achieve a prompt response to the subscriber's answer.

In addition, in a central control device the output signals from the detecting circuits of this invention are evaluated. In the absence of a call in a subscriber's station, a simulator of subscriber's apparatus is connected to the circuit from a central control device, and by means of a testing device the subscriber's circuit can be examined.

The method of this invention makes it in advantageous manner possible that the subscriber's circuit can be regularly tested by the detecting circuit. Equipment needed for this purpose is very compact and inexpensive to maintain.

The novel features which are considered characteristic for the invention are set forth in particular in the appended claims. The invention itself, however, both as to its construction and its method of operation, together with additional objects and advantages thereof, will be

DESCRIPTION OF THE PREFERRED EMBODIMENTS

Figure 1:
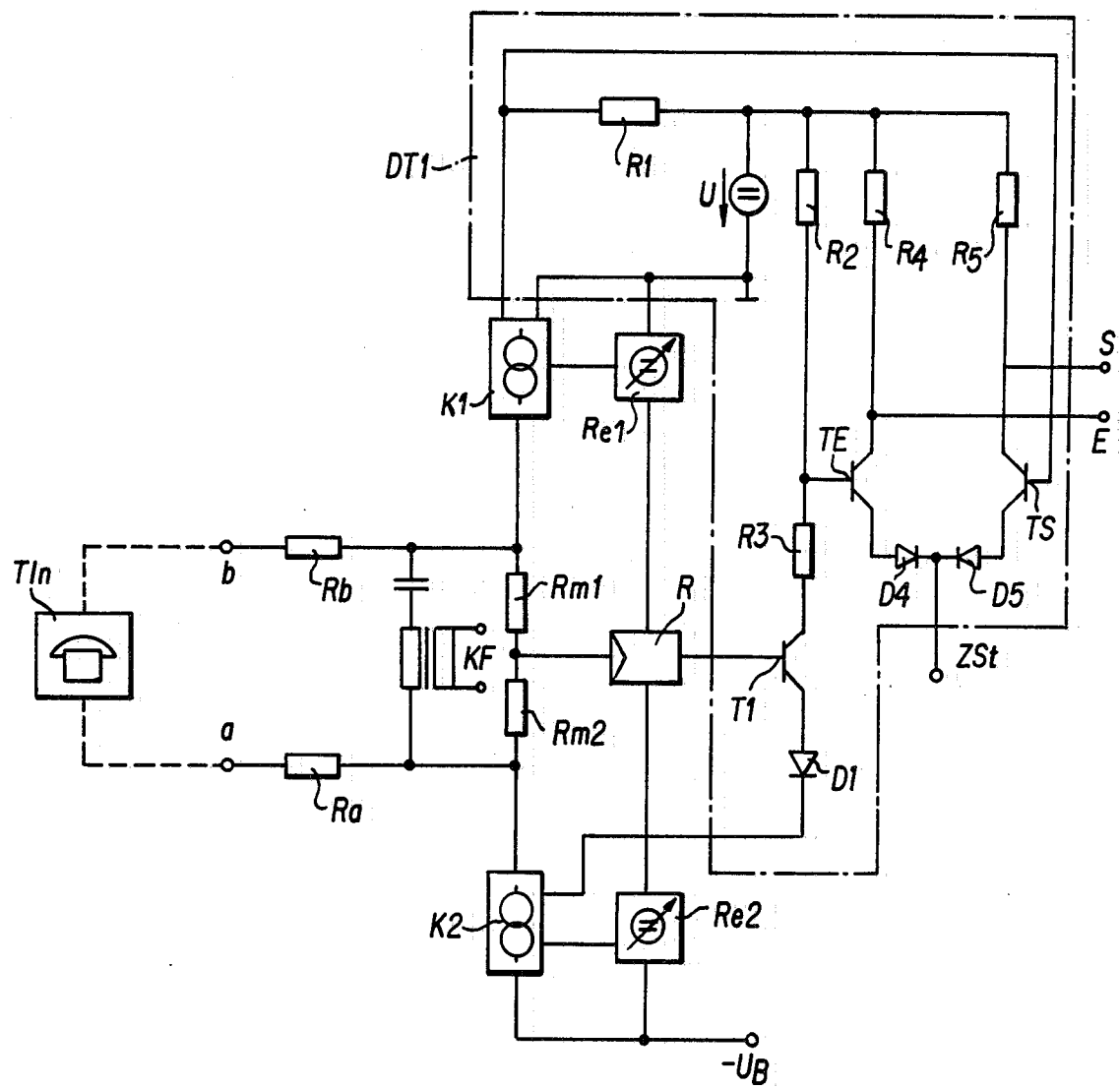
FIG. 1 is a first embodiment of a signal detecting circuit for the recognition of the activation of a ground button and of the closing of the telephone loop.

A subscriber's circuit according to FIG. 1 includes two sources K1 and K2 of constant current connected symmetrically to telephone lines a and b leading to a subscriber's station TLN. The resistance of the two telephone wires a and b, which varies proportionally to the length of the two wires, is indicated by resistors $R_a$ and $R_b$. The secondary coil of a telephone transformer at an exchange station is coupled via a capacitor to the lines a and b, and as soon as a connection is established an alternating speech voltage is applied in the subscriber's circuit. The terminals of the primary coil of the coupling transformer are connected to a non-illustrated coupling field KF of the exchange station.

In this embodiment, the sources of constant current K1 and K2 include each two transistors and a resistor connected in the collector-emitter of the second transistor of the pair and acting as a shunt. The base of the first transistor in each pair is connected to a voltage divider RE1 and RE2 which supply respectively the reference voltage to the current sources K1 and K2. A regulating device R is coupled between the voltage dividers of both current sources.

The collectors of the first transistors in each source are connected to one pole of an operating power supply. The collectors of the second transistors in respective sources are connected to the assigned lines a and b and are interconnected by series-connected resistors RM1 and RM2. The common point of the two resistors RM1 and RM2 is connected to the voltage regulating device R. Both resistors RM1 and RM2 are equal in value so that in the case of constant and equal current branches in respective telephone lines a and b, one half of the secondary speech voltage on the coupling transformer drops across each of the two resistors. If the voltage drop across one of the two resistors is smaller than across the other one, then a potential difference appears on the common connection point and causes that the voltage regulating device R compensates a corresponding difference in the reference voltages for the current sources K1 and K2, until the voltage drops on respective resistors RM1 and RM2 equal again half of the speech voltage induced by the coupling transformer. In the case of compression of the ground button, or during a short-circuit to ground, the resulting displacement of the point of symmetry of the voltage drop between resistors RM1 and RM2 cannot be compensated by the regulating device R (symmetry regulating device). In order to prevent thermal overload of one or both constant-current sources K1 and K2, the symmetry regulator R is blocked, and by connecting a suitable resistor in the voltage dividing chain of resistors, the reference voltage for the two current sources K1 and K2 is lowered and the current flowing through the two branches of the telephone loop are reduced to a corresponding value. The chain of resistors including the voltage dividers for setting the reference voltages and the adjustment resistor, is connected between the poles of the operating power supply.

In order to detect the closing of the telephone loop, loop pulses and ground pulses, a first detecting circuit DT1 is coupled to the constant-current sources K1 and K2, to a source of reference voltage RE1, to the signal regulating device R, and to a central control device ZST. When current supplied from sources K1 and K2 cannot flow through the telephone loop or circuit because the subscriber's station is not closed, the second transistor of the current source K1 is blocked. On the other hand, if a current flow path in the loop is established, this transistor operates in its active region, so that the closing of the telephone loop can be detected on its collector. The first detecting circuit DT1 includes a voltage source, one pole of which is connected both to the first constant-current source K1 and to the reference voltage generating device RE1 and to ground. The other pole of the voltage source U is connected via a measuring resistor R1 to the other terminal of the first current source K1. In closing the telephone loop, a current starts flowing through the resistor R1 and the evaluation of the resulting voltage drop across R1 is effected by means of a transistor TS. The emitter of transistor TS is connected via a diode D5 to the central control device ZST. The collector of transistor TS is connected to a terminal S at which a signal indicative of the closed condition of the telephone loop is read. A resistor R5 connects the collector of transistor TS to the voltage source U. The detection and reading of the closed condition of the telephone loop is possible as soon as the cathode of the diode D5 is connected in the central control station ZST to the ground potential. In a modification it is possible to connect the emitters of both transistors TS and TE to ground.

A voltage divider constituted by resistors R2 and R3 connects the collector of transistor T1 to the constant voltage source U, and the emitter of transistor T1 is connected through diode D1 to the second source of constant current K2. The base of the first transistor T1 is connected to the signal regulating device R. If the regulating device R is unblocked, the transistor T1 is blocked. As mentioned before, if the ground button is pressed, or if a ground short-circuit occurs, the symmetry regulator R and the two constant-current sources K1 and K2 cannot compensate for the resulting shift of symmetry, and consequently regulator R becomes blocked, whereas transistor T1 is active. Current flowing through the collector-emitter circuit of transistor T1 produces a voltage drop on voltage divider R2, R3 which is employed for activating a transistor TE indicating the actuation of the ground button by the subscriber. The transistor TE has its base connected to the common connection point of the voltage divider resistors R2, R3. The collector of transistor TE is connected via resistor R4 to the non-grounded pole of the voltage source U. The emitter of transistor TE is connected via a diode D4, which is oriented against the forward direction of the diode D5, to the central control device ZST. Upon application of a certain potential to the common cathode connection of the two diodes D4 and D5 from the control device ZST, a signal is detectable on the terminal E connected to the collector of transistor TE, which is indicative of the actuation of the ground button at the subscriber's station. The whole detecting circuit DT1 is designed so as to have a negligible power consumption.

Figure 2:
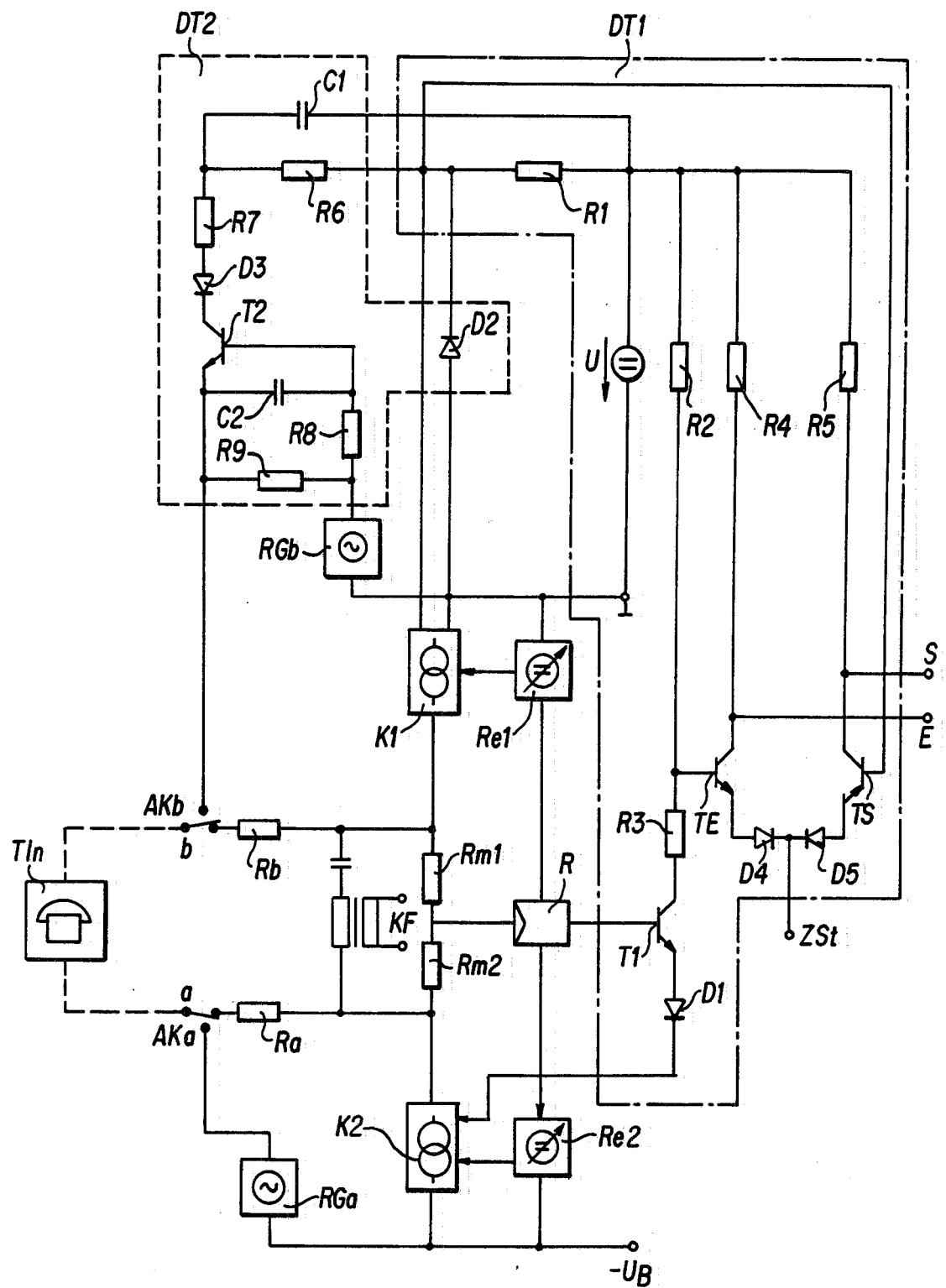
FIG. 2 is another embodiment of the signal detecting circuit for the recognition of the closing of the loop during the ringing action.

FIG. 2 illustrates a second signal detecting circuit DT2 cooperating with the first detecting circuit DT1 (corresponding to FIG. 1), the first constant-current source K1, with a ringing generator RGB and a switching contact AKB. The latter contact AKB serves for feeding a testing ringing current into line b leading to the subscriber's station TLN. The ringing generator RGB is connected to a terminal of the operational power source U. The other terminal of the ringing RGB is connected via resistor R9 to the switching contact AKB. A timing member R8, C2 has its resistor R8 connected to the common point of the ringing generator RGB and resistor R9. The other end of resistor R8 together with capacitor C2 is connected to the base of transistor T2, whereas the other end of capacitor C2 is connected to the emitter of this transistor. The collector of transistor T2 is connected via a diode D3 and a resistor R7 to the common connection point of a further timing member R6, C1. The other connection of resistor R6 is connected to the constant-current source K1 and to the cathode of a diode D2 connected between the first signal detecting circuit DT1 and the current source K1. The other end of capacitor C1 is connected to the non-grounded pole of the constant voltage source U.

When a subscriber's station TLN is called by a caller, then ringing current flows through lines a and b from the +pole of the operating power source, through the ringing generator RGB, resistor R9, the switching contact AKB, branch line b, an alarm of the subscriber's station TLN, branch line a, a switching contact AKA, another ringing generator RGA to the −pole of the operating power source $U_B$. The signal detecting circuit DT2 delivers an output signal at its terminal S when upon picking up the receiver in the subscriber's station TLN a flow of direct current is initiated. The second detecting circuit DT2 should not respond to the ringing alternating current flowing through the loop branches a and b.

The generation of the ringing voltage in the embodiment illustrated in FIG. 2 is effected in such a manner that one half of the ringing voltage (30 volts effective) in the telephone branch b is symmetrical to the ground and the other half of the ringing voltage (30 volts effective) together with the superposed DC power source voltage (for example −48 volts) are applied to the branch line a. The ringing voltage therefore contains a DC voltage component. Accordingly, a direct current flow starts when the receiver in the subscriber's station TLN is picked up.

The ringing current generates during the open telephone loop a purely alternating voltage drop across the resistor R9 when the latter is connected to the line b and the subscriber's loop is open. By timing RC member, constituted by the resistor R8 and capacitor C2, this alternating voltage drop is so attenuated that transistor T1 is either completely inactive or active only during the peaks of the ringing current. In the latter case, however, since the emitter of transistor T2 is on a positive potential and thus the diode D3 is blocked, no current flows from the +pole of the voltage source in the signal detecting circuit DT1 via the resistor R1, resistor R6, resistor R7 and the diode D3.

On the other hand, when the subscriber's loop is closed, the resulting current flowing through resistor R9 causes a direct-current voltage drop which makes the transistor T2 conductive. In the time intervals during which the emitter of transistor T2 is on negative potential, a current flows through the diode D3 and the resistor R7. This intermittent current loads the capacitor C1, thus making more negative the potential on the common connection point of resistors R6 and R1. According to this invention, this connection point is connected to the base of transistor TS and, due to the potential change, the transistor TS is blocked.

As has already been described in connection with FIG. 1, the detection of the closed condition of the telephone loop is thereby recognizable by the signal on the terminal S. The diode D2 limits the negative voltage occurring on the base of the transistor TS.

The second detecting circuit DT2 is to be dimensioned such that short pulses of interfering current do not suffice to load capacitor C1 to the critical potential. Such short interfering current pulses can result for example due to phase shifts between the ringing current and the ringing voltage when purely alternating current is present.

Figure 3:
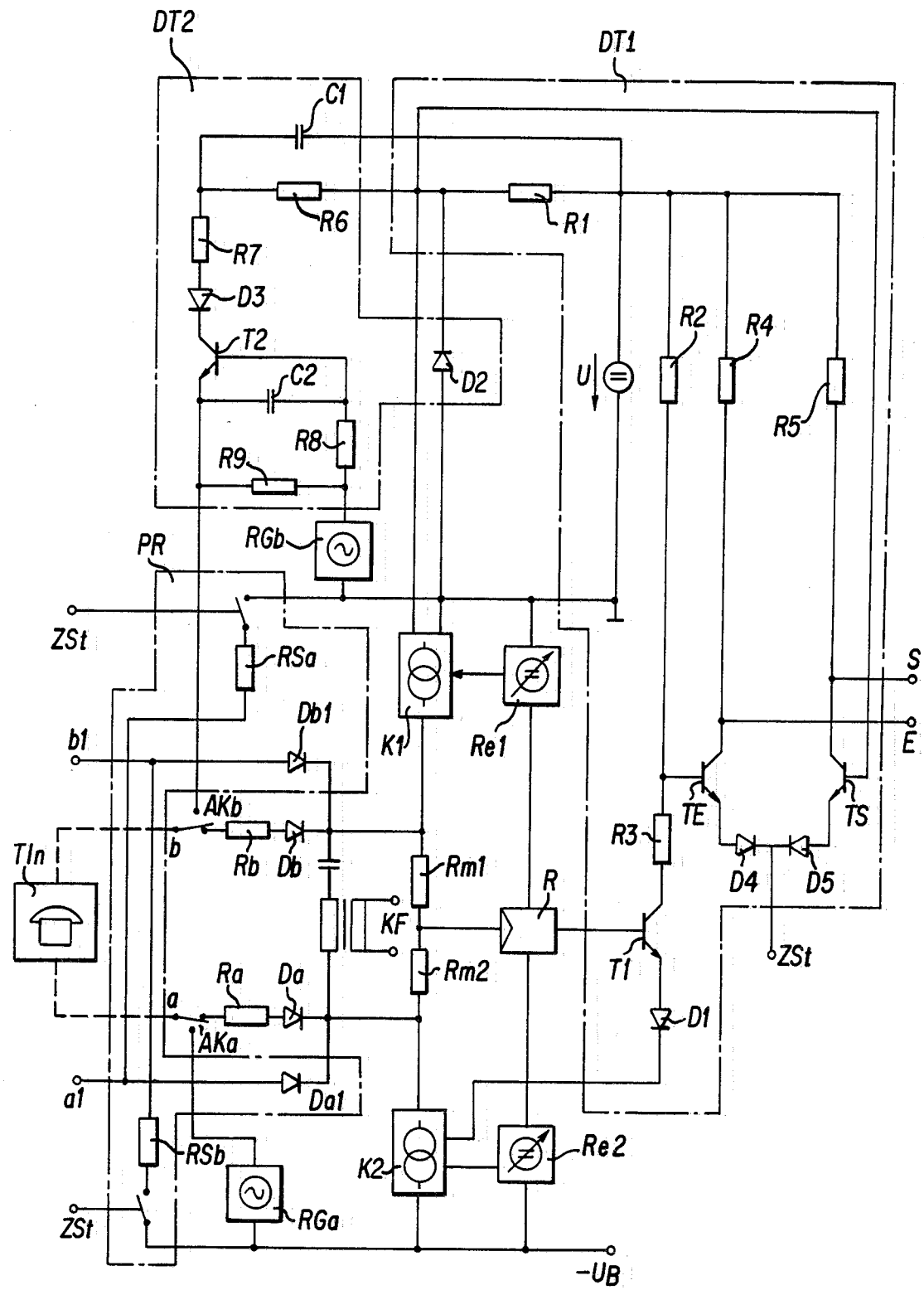
FIG. 3 is a testing device for cooperation with a simulator of the subscriber's station.

FIG. 3 depicts a schematic diagram of a testing device PR connected to the poles of the operating power source UB and to the connecting contacts ZST of the central control device through resistors RSA and RSB. An additional pair of connection points b1 and a1 is connected via diodes DB1 and DA1 to the secondary coil of the telephone transformer. The subscriber's lines b and a include respectively series connections of resistor RB and diode DB and a series connection of resistor RA and diode DA connected in forward direction between the switches AKB and AKA and the corresponding outlets of the secondary winding of the telephone transformer. This arrangement of two pairs of diodes DB1, DB and DA1, DA connected opposite each other to the secondary winding of the transformer ensure that the connection pair of wires b1 and a1 is uncoupled from the telephone lines b and a.

When the contacts controlled from the central control device ZST are closed, and the current path for the resistors RSA or RSB is completed, a short-circuit to ground for the detecting circuit DT1 is simulated. If both contacts to the resistors RSA and RSB are simultaneously closed, then a simulated telephone or subscriber's loop is created for the detecting circuit DT1.

The resistors RSA and RSB are of such a value as to produce simulation and evaluation by the detecting circuit DT1 even in least favorable conditions. In practice, several identical power supply and detecting circuits are combined into a single module. In performing the above described simulation of the subscriber's loop, the two connection points a1 and b1 are interconnected. By simultaneously closing the current path for resistors RSA and RSB in each testing device of a module, it is possible to test simultaneously each feeding and detecting circuit. It is also of advantage when the described feeding and detecting circuits require considerably less insulation space, smaller energy consumption and smaller manufacturing costs when compared to prior-art devices of this kind.

It will be understood that each of the elements described above, or two or more together, may also find a useful application in other types of constructions differing from the types described above.

While the invention has been illustrated and described as embodied in specific examples of signal detecting and testing circuit arrangements, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of determining current criteria in a subscriber's two wire circuit of a telephone system in which a subscriber's station is connected at one end of two wires and a symmetrical voltage divider is connected at the other end of the two wires, two separate constant current sources being connected to respective connection points of the voltage divider with the wires, each constant current source being adjustable by a reference voltage so as to keep constant current in the circuit irrespective of the length of the wires, comprising the steps of measuring current flowing through individual wires of the circuit and, in the case of a difference between the measured currents, then adjusting by means of a symmetry regulating device the reference voltage for at least one constant current source, to a value at which current flowing through the circuit is limited to a maximum value and the regulating device is blocked and, at the same time, detecting and evaluating signals delivered by the regulating device during the adjusting step to determine from said signals the condition of the subscriber's circuit, and further comprising the step of connecting into the subscriber's circuit a device for simulating the subscriber's station, then introducing into the simulating device voltage signals corresponding to depression of the ground button of the subscriber's station or a short-circuit to ground of a branch of the subscriber's circuit and testing and evaluating the condition of the circuit by the voltage signals.

2. A circuit arrangement for determining current criteria in a subscriber's two wire circuit of a telephone system in which a subscriber's station is connected at one end of two wires and a symmetrical voltage divider is connected at the other end of the two wires, two mutually independent constant current sources being connected to respective connection points of the voltage divider with the wires, an adjustable reference voltage source connected to each constant current source so as to keep constant current in the circuit irrespective of the length of the wires, comprising a detecting circuit including means for measuring current flowing through individual wires of the circuit; a symmetry regulating device coupled to the detecting circuit and to one reference voltage source to adjust, in the case of a difference between the measured currents, the reference voltage of said one source to a value at which current flowing through the subscriber's circuit is limited to a maximum value and the regulating device is blocked; and said detecting circuit further including means for detecting and evaluating signals delivered by said measuring means and by the regulating device during the reference voltage adjustment to determine from said signals conditions corresponding to the short-circuit of the subscriber's circuit to ground and/or to the actuation of ground button; wherein said detecting circuit includes a source of constant voltage connected to the source of constant current and a first transistor having its base connected to the adjustable source of constant voltage and its collector-emitter path connected via a series of resistors between the two constant-current sources.

3. A circuit arrangement as defined in claim 2, further including a second transistor and a third transistor, the emitter and collectors paths of the second and third transistors being connected across the source of constant voltage, the base of the second transistor being connected to a source of constant current and its collector being connected to a terminal for detecting and evaluating a closed condition of the subscriber's circuit, and the base of the third transistor being connected via a voltage divider to the collector of the first transistor to detect and evaluate the actuation of the ground button.

4. A circuit arrangement as defined in claim 3, wherein the emitters of the second and third transistors are connected to a common point via a forwardly directed diode each, said common point being connectable via a central control devices to the constant voltages source.

5. A circuit arrangment for determining current criteria in a subscriber's two wire circuit of a telephone system in which a subscriber's station is connected at one end of two wires and a symmetrical voltage divider is connected at the other end of the two wires, two mutually independent constant current sources being connected to respective connection points of the voltage divider with the wires, an adjustable reference voltage source connected to each constant current source so as to keep constant current in the circuit irrespective of the length of the wires, comprising a detecting circuit including means for measuring current flowing through individual wires of the circuit; a symmetry regulating device coupled to the detecting circuit and to one reference voltage source to adjust, in the case of a difference between the measured currents, the reference voltage of said one source to a value at which current flowing through the subscriber's circuit is limited to a maximum value and the regulating device is blocked; and said detecting circuit further including means for detecting and evaluating signals delivered by said measuring means and by the regulating device during the reference voltage adjustment to determine from said signals conditions corresponding to the short-circuit of the subscriber's circuit to ground and/or to the actuation of ground between, and further comprising a ringing generator, switching means in each wire of the subscriber's circuit, and a second detecting circuit connected by the switching means between the subscriber's set, the ringing generator and a source of constant current.

6. A circuit arrangement as defined in claim 5, wherein separate ringing generators are connectable via said switching means to respective branches of the subscriber's circuit, one of the ringing generators being connected to one pole of the operating power supply, and the other ringing generator being connected to the other pole of the power supply via a measuring resistor.

7. A circuit arrangement as defined in claim 6, wherein the second detecting circuit comprises an RC member connected to the common point of the measuring resistor and the other ringing generator, a fixed resistor having its base connected to the common point of the RC member, its emitter connected to the capacitor of the RC member at the measuring resistor, and its collector being coupled to the constant source of voltage.

8. A circuit arrangement as defined in claim 7, wherein the collector of the fifth transistor is connected via a series connection of a diode and a resistor to an additional RC member, the resistor of which is connected to the source of constant current and the capacitor of which is connected to the source of constant voltage.

9. A method of determining current criteria in a subscriber's two wire circuit of a telephone system in which a subscriber's station is connected at one end of two wires and a symmetrical voltage divider is connected at the other end of the two wires, two separate constant current sources being connected to respective connection points of the voltage divider with the wires, each constant current source being adjustable independently one from the other by a reference voltage so as to keep constant current in the circuit irrespective of the length of the wires, comprising the steps of measuring current flowing through individual wires of the circuit and, in the case of a difference between the measured currents, then adjusting by means of a symmetry regulating device the reference voltage for one constant current source, to a value at which current flowing through the circuit is limited to a maximum value and the regulating device is blocked and, at the same time, detecting and evaluating signals delivered by the regulating device during the adjusting step to determine from said signals the ground-impulse conditions of the subscriber's circuit.

10. A circuit arrangement for determining current criteria in a subscriber's circuit of a telephone system, comprising a first detecting circuit connectable to respective sources of constant current and to an adjustable reference voltage source to determine upon activation from a central control device, conditions corresponding to the actuation of ground button and/or the short-circuit of the subscriber's loop to ground, and further including a testing circuit connectable to the subscriber's circuit for simulating the subscriber's station the testing circuit comprising a pair of switching contacts controlled from a central control device for connecting and disconnecting the subscriber's circuit to an operating power source.

11. A circuit arrangement as defined in claim 10, wherein the testing circuit includes additional contact points connected with the switching contacts by resistors and to the primary winding of a telephone transformer in the subscriber's circuit by means of forwardly directed diodes.

12. A circuit arrangement for determining current criteria in a subscriber's two wire circuit of a telephone system in which a subscriber's station is connected at one end of two wires and a symmetrical voltage divider is connected at the other end of the two wires, two mutually independent constant current sources being connected to respective connection points of the voltage divider with the wires, an adjustable reference voltage source connected to each constant current source so as to keep constant current in the circuit irrespective of the length of the wires, comprising a detecting circuit including means for measuring current flowing through individual wires of the circuit; a symmetry regulating device coupled to the detecting circuit and to one reference voltage source to adjust, in the case of a difference between the measured currents, the reference voltage of said one source to a value at which current flowing through the subscriber's circuit is limited to a maximum value and the regulating device is blocked; and said detecting circuit further including means for detecting and evaluating signals delivered by said measuring means and by the regulating device during the reference voltage adjustment to determine from said signals conditions corresponding to the short-circuit of the subscriber's circuit to ground and/or to the actuation of ground button.

* * * * *